United States Patent
Matsubara et al.

(10) Patent No.: US 7,807,273 B2
(45) Date of Patent: Oct. 5, 2010

(54) ALLOY-COATED BOILER PART AND METHOD OF WELDING SELF-FLUXING ALLOY-COATED BOILER PART

(75) Inventors: Yoichi Matsubara, Kawasaki (JP); Yoshinobu Sochi, Kawasaki (JP); Makoto Kumakawa, Kawasaki (JP); Shin-Nan Lee, Taipei (TW)

(73) Assignees: Dai-Ichi High Frequency Co., Ltd., Kanagawa (JP); Flourshing Enterprise Co., Ltd., Taipei (TW)

( * ) Notice: Subject to any disclaimer, the term of this patent is extended or adjusted under 35 U.S.C. 154(b) by 349 days.

(21) Appl. No.: 10/593,050
(22) PCT Filed: Mar. 24, 2005
(86) PCT No.: PCT/JP2005/005387

§ 371 (c)(1),
(2), (4) Date: Aug. 28, 2008

(87) PCT Pub. No.: WO2005/090862

PCT Pub. Date: Sep. 29, 2005

(65) Prior Publication Data

US 2008/0318078 A1 Dec. 25, 2008

(30) Foreign Application Priority Data

Mar. 24, 2004 (JP) .............................. 2004-088063

(51) Int. Cl.
| | |
|---|---|
| B32B 15/18 | (2006.01) |
| C22C 19/05 | (2006.01) |
| F22B 37/04 | (2006.01) |
| F22B 37/10 | (2006.01) |
| B23K 9/00 | (2006.01) |
| B23K 9/235 | (2006.01) |

(52) U.S. Cl. .................... 428/614; 428/679; 428/680; 428/683
(58) Field of Classification Search ........................ None
See application file for complete search history.

(56) References Cited

U.S. PATENT DOCUMENTS 2,875,043 A * 2/1959 Tour ......................... 420/457
6,055,943 A * 5/2000 Cochrane et al. ............. 122/6.5

FOREIGN PATENT DOCUMENTS

| JP | 07060481 A | * | 3/1995 |
| JP | 9-256100 A | | 9/1997 |
| JP | 10-30140 A | | 2/1998 |

OTHER PUBLICATIONS

English Machine Translation of JP07-060481—Printed Nov. 2, 2009.*
International Search Report of PCT/JP2005-005387 date of mailing Jun. 28, 2005.

* cited by examiner

Primary Examiner—Jennifer C McNeil
Assistant Examiner—Adam C Krupicka
(74) Attorney, Agent, or Firm—Westerman, Hattori, Daniels & Adrian, LLP

(57) ABSTRACT

An alloy-coated boiler part is furnished with a melted coating of alloy material excellent in erosion/corrosion resistance when joined by welding, and free from thermal shock cracking. Super alloy coating (15) is applied over rapid temperature rise region width (C), where thermal shock cracking may occur at a welding operation, at end portions subjected to weld joint including the vicinity. Self-fluxing alloy coating (16) is applied on remaining regions other than the rapid temperature rise region width (C). While over a half proportion of each of the alloy coatings (15, 16) occupied by an Ni-enriched Ni—Cr component, the super alloy coating (15) has the contents of B and Si suppressed to equal or less than 0.1% and equal or less than 0.5%, respectively, and in the self-fluxing alloy coating (16), the content of each of B and Si is in the range of 1 to 5%.

5 Claims, 9 Drawing Sheets

Fig. 7
(a) 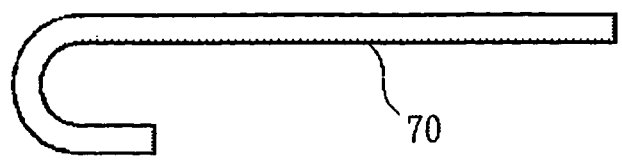
(b) 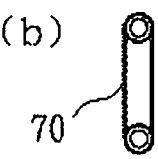
(c) 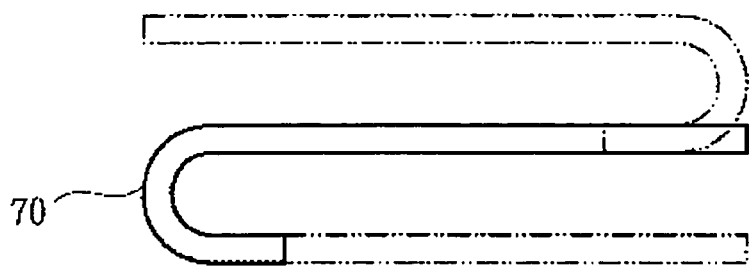
(d) 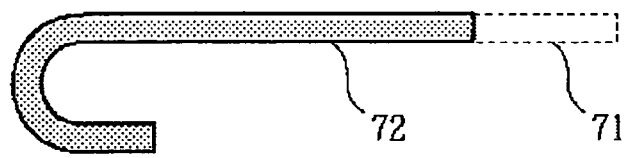
(e) 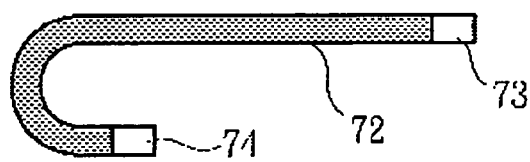
(f) 
(g) 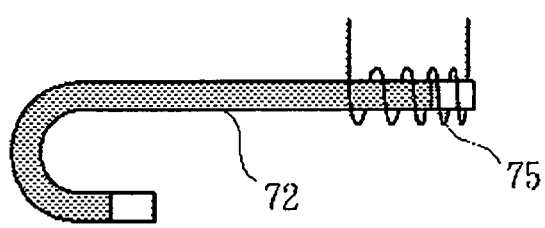
(h) 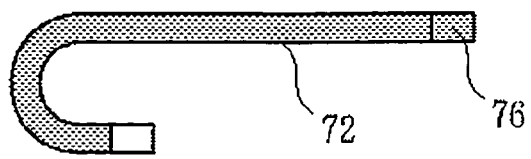

Fig. 8
(a)
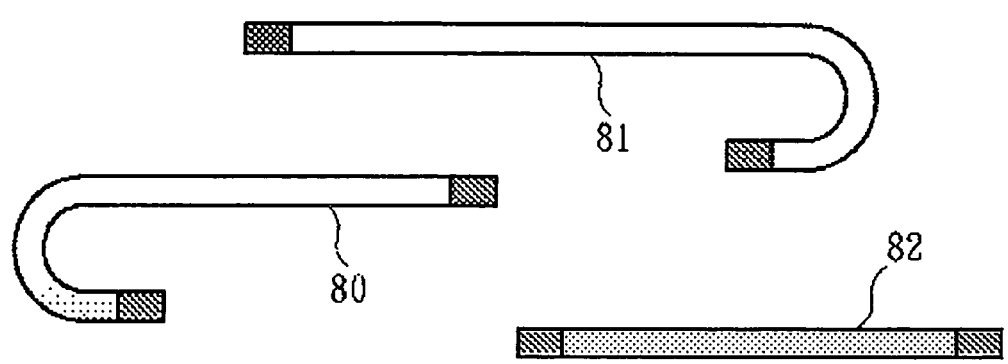
(b)
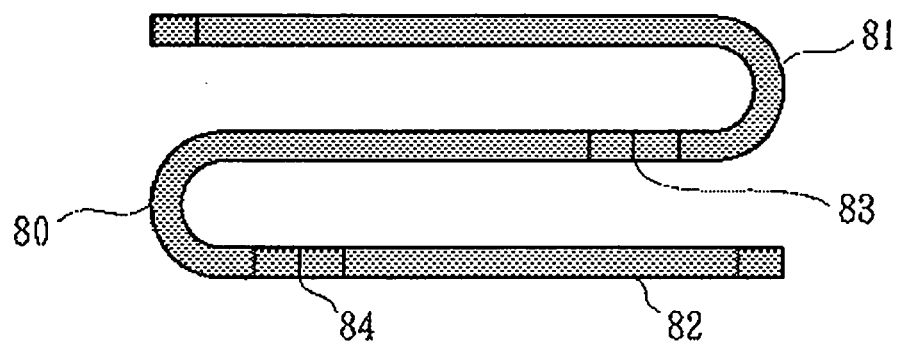

Fig. 9
(a)
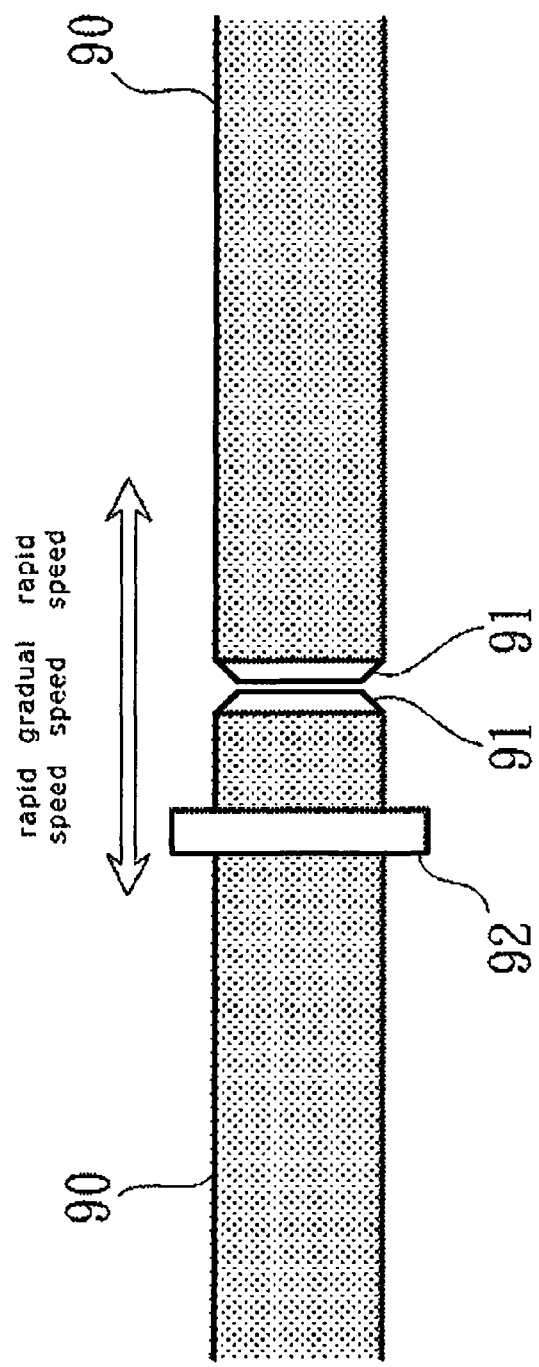
(b)
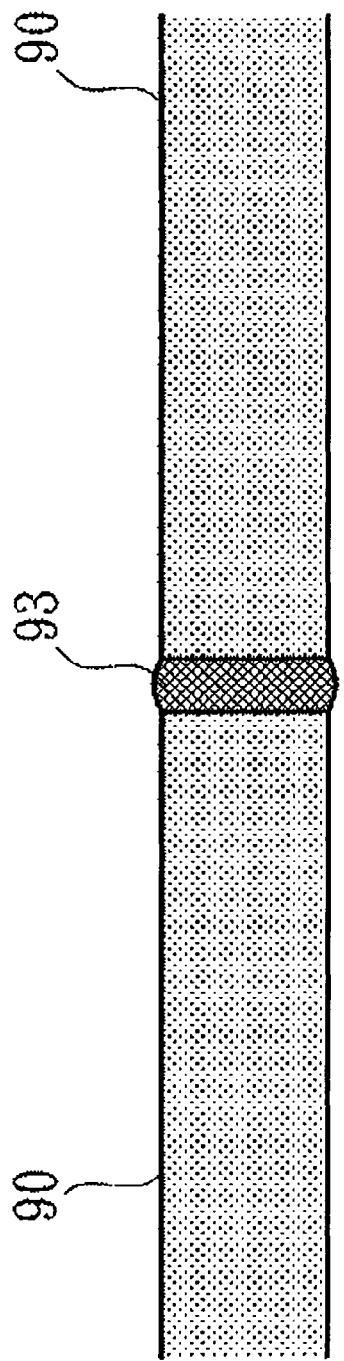

ALLOY-COATED BOILER PART AND METHOD OF WELDING SELF-FLUXING ALLOY-COATED BOILER PART

TECHNICAL FIELD

The present invention relates to a boiler part such as a tube part (hereinafter, referred to as "boiler tube") constituting a heat transfer tube in various types of boilers, or a plate material-tube material composite panel (hereinafter, referred to as "boiler furnace panel") constituting a furnace housing with a cooling-water passage, and more specifically to a boiler part with alloy coating for improving durability and suitable to the welding, and a method of welding an alloy-coated boiler part.

BACKGROUND ART

Firstly, taking an example of boiler tube, in the past days when the operation temperature of the boiler was lower than that in these days, and erosion/corrosion environment inside the furnace was not so severe, the steel tube for boiler (low alloy steel tube) was commonly used without coating taking into consideration of high temperature usability and mechanical characteristics. Although stainless tube and titanium tube were also used for the application of requiring corrosion resistance, such uses were not common because of the high costs.

In recent years, boilers recovering and utilizing refuse incineration heat have increased, problem of erosion (wear) is caused by combustion ash dust. In order to solve this problem, boilers with a specification applying thermal spray coating of self-fluxing alloy (first alloy material) with high erosion resistance are starting to be commonly used.

However, the above described self-fluxing alloy coating is the coating which is left as thermal-sprayed by, for example, HVOF (High Velocity Oxygen Fuel) thermal spraying apparatus (that is, the coating is porous having pinholes reaching base metal herein after referred to as "unmelted coating"); a self-fluxing alloy coating subjected to the melting process after thermal spraying is rarely used although melted coating is commonly used in other application (for example, rollers for metal sheet processing line) (which is modified from the porous coating into the dense coating, and provided with sufficient environment blocking function without pinholes, and is the example of the "melted coating").

The reason why the application of the melted coating of the self-fluxing alloy for the boiler tube is uncommon is that an extraordinary difficult work is required because the thermal shock cracking easily occurs to the boiler tube on its melted coating under rapid local temperature rise at the time of the welding operation when the boiler tube is welded to connect, the whole tubes have to be preheated inside the furnace, then connected by welding at high temperature.

However, as for the boilers in recent years, the problems concerning not only erosion but also corrosion are becoming important together with the demand for high-temperature burning to make the exhaust air harmless, thus melted coating application to the boiler is increasingly desired in the form of provision of prefabricated coating portion.

As one example thereof, a constitution that adopted the melted coating of the self-fluxing alloy to the boiler tube is disclosed in the patent document 1 (Japanese Patent Application Laid-Open (JP-A) No. H10-170194). There the constitution provides a non-coated portion of about 50 mm at an end portion of the boiler tube, excluded from the thermally sprayed coating where the non-coated portion is used as a part for the joint (the patent document 1, page 3, the fourth column, lines 15 to 16). Further, a process of fitting a protector member on the above non-coated portion is added instead of the coating, after the welding (Id. lines 24 to 26). The above process requires a special order of the protector member (for example, the protector member made of alumina) having high erosion resistance, or fitting operation inside narrow boiler. Therefore, the process results in higher cost in material and work, and also requires front loaded procurement of the materials.

As for another approach, one may imagine a method that adopts welding to connect prefabricated boiler tubes having unmelted coating of a self-fluxing alloy, at the construction site, and then apply the melting process by an induction heating or the like at that location. However, it is practically impossible due to the narrow space or difficulty in heating of the interfaced portion with the other members.

By the way, since, reheating-crack occurs unless the entire simultaneous melting or one direction melting is performed in the melting process of the self-fluxing alloy, the induction heating is indispensable for such an execution at the construction site.

Next, in the case of the boiler furnace panel, since it is composite constitution in which tube materials and plate materials are arranged alternately as described above, or since it has large dimension (for example, 0.5 m×6 m), use of a practical supplemental member corresponding to the above protector is more difficult. Further there is the problem of the complicated shape distortion associated with the melting process after the thermal spraying (see the patent document 2 or the patent document 3). Thus utilization of the prefabricated melt-coating product itself has been difficult to consider under such circumstances.

Patent Document 1: JP-A No. 10-170194
Patent Document 2: JP-A No. 2001-4101
Patent Document 3: JP-A No. 2000-329304

DISCLOSURE OF THE INVENTION

Problem to be Solved by the Invention

The first problem is to provide an alloy-coated boiler part that is coated with melted coating of alloy material with high erosion and corrosion resistance at all regions to be protected and that is free from thermal shock cracking even when joined by the welding.

Further, the second problem is to provide a method of welding self-fluxing alloy coated boiler parts to which the melted coating of the self-fluxing alloy has been applied at all regions, where the method enables the welding for joining the boiler part and so on free from thermal shock cracking.

Means for Solving the Problems

The alloy coated boiler part according to the present invention has been devised for solving the above mentioned first problem and is characterized in that an alloy coated boiler part used by being welded to be joined, is constituting of a base metal and an alloy coating applied thereon, where the alloy material is comprising of an Ni (Nickel)-enriched Ni—Cr (chromium) component with over a half proportion of the alloy material, a melted coating of said alloy material further comprising of reduced contents of B (Boron) and Si (Silicon) as melting point lowering elements with 0.1 weight % or less B and 0.5 weight % or less Si (the second alloy material), is applied over end portions subjected to weld joint including the vicinity thereof where thermal shock cracking may occur due to a rapid temperature rise at the welding operation, and a melted coating of said alloy material further comprising of B and Si with each content in the range of 1 to 5 weight % (any of 1% or more and 5% or less) (the first alloy material), is applied (desirably by after-thermally sprayed melt-coating) on any remaining regions other than areas subject to the rapid temperature rise.

By the way, as for a forming means of the melted coating composed of the above second alloy material, there can be exemplified the weld building-up (one layer building-up if importance is given to cost, or two layers building-up if importance is given to component purity), although not limited to such method.

Further, a method of welding a self-fluxing alloy coated boiler part according to the present invention is devised for solving the above mentioned second problem, being a method of welding self-fluxing alloy coated boiler part where a melted coating (desirably after-thermally sprayed melt-coating) composed of a self-fluxing alloy material occupied by an Ni-enriched Ni—Cr component over a half proportion of the alloy material and further occupied by B and Si in the range of 1 to 5 weight % respectively (the first alloy material) is applied to a base metal, the method is characterized by comprising the steps of:

forming a gradation preheated region, around the end portion subjected to the welding, upon applying preheating process having a heating pattern where an amount of temperature raising gradually reduces inward from the end portion by using slow heating condition with a speed of temperature raising at said end portions of 2 to 10° C./sec; and performing a welding operation of said end portions continuously (desirably, with the second alloy material occupied by an Ni-enriched Ni—Cr component over a half proportion of the alloy material and having the reduced contents of B and Si with 0.1 weight % or less for B and 0.5 weight % or less for Si.)

By the way, in the above welding operation, also a weld building-up operation for the end portion of single part and weld joint of the end portions of neighboring parts are included.

EFFECT OF THE INVENTION

The alloy coated boiler part of the present invention is constituted such that the melted coating composed of the alloy material having fusibility with melting point lowering elements sufficiently mixed (the first alloy material) has been applied at the most area except for the end portions. Thus, manufacture in a factory with high productivity and low cost same as those of ordinary thermal spraying-melting process can be performed. On the other hand, the end portion region has no choice but to depend on high cost implementation other than the thermal spraying such as the weld building-up or the like with low productivity. However, it is possible to manufacture with a low cost as a whole, since the region area is small.

The melt coating of the end portion region keeps the mixing amount of B, Si to a minimum, that is, the thermal coating is composed of the second alloy materials. Therefore, there is no fusibility, thus high productivity cannot be desired. However, instead of this, the end portion region is free from the thermal shock cracking sensitivity which the alloy material with sufficiently high concentration of B and Si exhibits.

With respect to durability, since the both coatings are the melt coatings, the environment blocking property is sufficient, further, also the corrosion resistance of the coating itself is significantly excellent due to high Ni—Cr composition. With respect to erosion resistance, the coating for the most region being composed of large amount of B, Si excels. However, since the difference is not serious, a treatment of adding difference to an initial coating thickness is capable of approximately equalizing the erosion resistance.

As described above, the first problem is solved.

According to the method of welding the self-fluxing alloy coated boiler part, the thermal shock cracking of the self-fluxing alloy melted coating caused by rapid temperature rise at the time of the welding, is not generated by providing "gradation preheated region" in such a way as to involve filler metal applied region. Because, it is possible to minimize the amount of rapid change of temperature over the entire region accompanied with the rapid temperature rise.

The above described welding method is useful when a rapid preparation of the alloy coated boiler part is required due to an unexpected condition such as dimension adjustment in the boiler construction site. For example, it is possible to prepare the alloy coated boiler part equivalent to the product, having been adjusted at the construction site, and free from the thermal shock cracking even when supplied for welding for joining, in following procedures; the self-fluxing alloy coated boiler part with melted coating manufactured in the factory is at first adjusted in dimension; then the coating of the self-fluxing alloy (the first alloy material) of the end portion is removed; and further, the weld building-up is performed to the end portion with the alloy material of the composition for the end portion (desirably, the second alloy material). Or it is possible to perform repair of the self-fluxing alloy coating by applying the above described pre heating-weld building-up to the coating defect portion (exfoliation portion or the like) of the member on which the self-fluxing alloy coating (the thermal sprayed coating or un-melted coating) has been applied.

Here, the gradation preheated region prepared before the building-up implementation is capable of being formed as gradual temperature distribution by performing induction heating using the solenoid coil in which winding density is gradually changed along the axis line direction so as to generate a gradient of heat input density along the axis line direction and by incorporating procedure of swinging a solenoid coil appropriately in the axis line direction.

The above preheating process is somewhat troublesome work. However, it is possible to implement reasonably in a narrow space inside the boiler, since the object region is an only narrow range, and further, a minimum scale of a high frequency power supply is required. By the way, the preheating in this welding method may be performed efficiently by the induction heating as described above. However, being not limited to this, it may be substituted by other heating method, such as, for example, gas heating.

Above described procedure is significantly effective in rapidly forming and saving beforehand at the boiler construction site the alloy coated boiler part that are easily jointed by welding.

The above described welding method, further, is also useful when intended to perform welding joint of the self-fluxing alloy coated boiler part having melted coating and cut in actual dimensions without generating thermal shock cracking at all events at that construction site in stead of preparing of the alloy coated boiler part; thus it becomes a temporary measure of corresponding to the boiler parts with a uniform alloy coating instead of provision of the alloy coated boiler part.

In the method of welding the self-fluxing alloy coated boiler part, it is desirable that the alloy material of the composition for the end portion (the second alloy material) is set to a filler metal while considering quality requirement (erosion/corrosion resistance) after the welding.

As described above, the second problem is solved.

BRIEF DESCRIPTION OF THE DRAWINGS

FIG. 7(a) is a plan view of a boiler tube showing a manufacturing process of the alloy coated boiler part according to the other embodiment of the present invention;

FIG. 7(b) is a plan view/end elevational view of a boiler tube showing a manufacturing process of the alloy coated boiler part with respect to the other embodiment of the present invention;

FIGS. 7(c) to 7(h) are plan views of a boiler tube showing a manufacturing process of the alloy coated boiler part according to the other embodiment of the present invention;

FIGS. 8(a) and 8(b) are plan views of a boiler tube showing a manufacturing process of the alloy coated boiler part according to the other embodiment of the present invention; and FIGS. 9(a) and 9(b) are plan views of major portions of a boiler tube showing a manufacturing process of the alloy coated boiler part according to the other embodiment of the present invention.

BEST MODE FOR CARRYING OUT THE INVENTION

Figure 1:
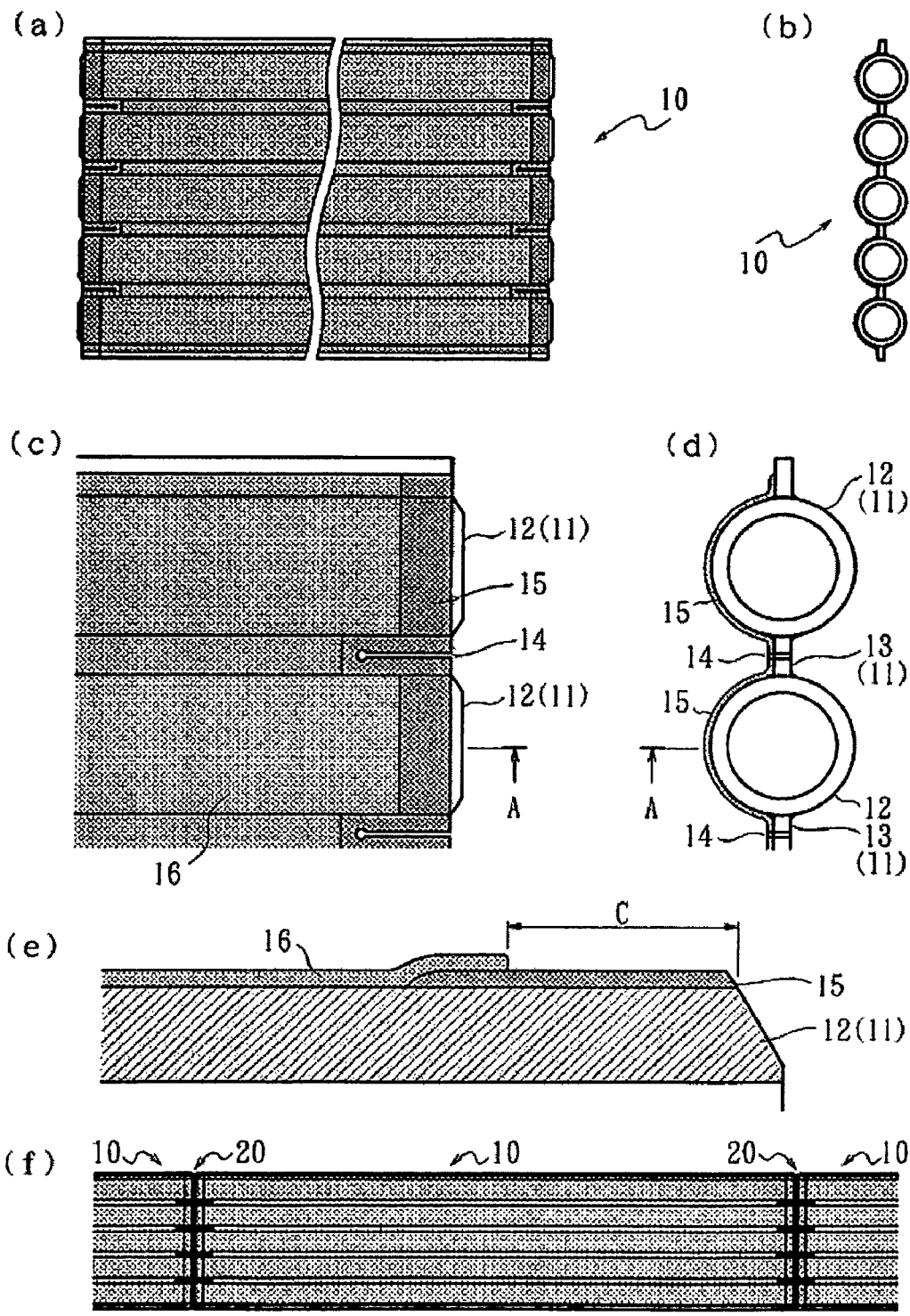
FIG. 1(a) is the entire plan view showing structure of an alloy coating boiler part according to an embodiment of the present invention.
FIG. 1(b) is the entire front view/end elevational view showing structure of an alloy coated boiler part according to an embodiment of the present invention.
FIG. 1(c) is an enlarged plan view of the major portion showing structure of an alloy coated boiler part according to an embodiment of the present invention.
FIG. 1(d) is a principal part enlarged front view/end elevational view showing structure of an alloy coated boiler part according to an embodiment of the present invention.
FIG. 1(e) is A-cross section enlarged view showing structure of an alloy coated boiler part according to an embodiment of the present invention.
FIG. 1(f) is a plurality of joined state plan view showing structure of an alloy coated boiler part according to an embodiment of the present invention.

Constitution of one embodiment of the alloy coated boiler part of the present invention will be described while referring to the drawings. FIG. 1(a) to FIG. 1(e) show structure of a boiler furnace panel 10 as the specific example of the alloy coated boiler part, in which FIG. 1(a) is the entire plan view; FIG. 1(b) is the entire front view/end elevational views; FIG. 1(c) is an enlarged plan view of the major portion; FIG. 1(d) is a principal part enlarged front view/end elevational view; FIG. 1(e) is cross section enlarged view; and FIG. 1(f) is a plurality of joined state plan view.

The boiler furnace panel 10 is one in which a super alloy coating 15 (the second alloy material coating) and a self-fluxing alloy coating 16 (the first alloy material coating) are thermally sprayed to a steel panel 11 (a base metal) at a factory beforehand, on the occasion of assembling of the furnace housing, neighboring end portions each other are weld joined while overlapping a plurality of panels at the construction site. That is, a steel panel 11 (plate material-tube material composite panel) is constituted such that, in order to form a base unit of furnace housing with a cooling water passage, a tube portion 12 (tube material) forming a cooling water passage and a plate portion 13 (plate material) forming a joint portion are arranged alternately and these are joined tightly with weld joint or the like, further, for erosion/corrosion resistance, at the one side (portion to be protected) of the housing, being furnace inner wall, except for end portions for weld joint, weld sprayed coating composed of the alloy material is formed on the entire area.

In the thermal spraying, the super alloy coating 15 and the self-fluxing alloy coating 16 are used separately for reduction of the cost of material and the cost of construction, in which the super alloy coating 15 is carried out at belt shaped region (rapid temperature rise region) in the end portions of a tube end side provided to weld joint portion 20 among panel end portions, while the self-fluxing alloy coating 16 is carried out at remaining region among region to be protected. The rapid temperature rise region is a region in which the thermal shock cracking may occur in self-fluxing alloy coating at the time of the weld operation, since the rapid temperature rise region width C differs depending on a steel material shape or coating thickness or the like, it cannot be described sweepingly, but, in the boiler furnace panel, it may be about 15 to 50 mm (any of 15 mm or more and 50 mm or less).

Of course, with respect to the end portion of the plate portion 13, the super alloy coating 15 is formed up to inner portion exceeding it. That is, the super alloy coating 15 enters into not only the rapid temperature rise region but also the remaining region which is a region exceeding it while extending up to about two times of the rapid temperature rise region width C. Further, at that position, a thin notching 14 with a width of about 0.5 to 2 mm is formed. This secures warping margin for weld aligning of the tube portion 12, and may extend to a degree of several times of the rapid temperature rise region width C together with the super alloy coating 15 of the end portions of the plate portion 13 depending on thickness of the tube portion 12. At end portion surface of the tube portion 12, large chamfer/taper to become a welding groove is provided.

The material of the super alloy coating 15 is occupied by an Ni-enriched Ni—Cr component over a half proportion of the alloy material, however, contents of B and Si being melting point lowering elements are suppressed such that B is 0.1% or less and Si is 0.5% or less for avoiding a thermal shock cracking at the time of the welding operation. As standards for stipulating such alloy material, in Japan, there are listed JIS G 4901 for bar material, or JIS G 4902 for plate material, as International standards, there are listed ISO 4955, or ISO 9723. Thickness of the super alloy coating 15 is about 1.2 to 3.0 mm.

The material of the self-fluxing alloy coating 16 is occupied by an Ni-enriched Ni—Cr component over a half proportion, and contents of B, Si are set to 1 to 5% (weight ratio) respectively in order that steep rise of material cost is made to suppress and efficient implementation is brought by the thermal spraying process and the melting process. As the alloy material, in Japan, there is listed Nickel self-fluxing alloy material of composition stipulated in a JIS H 8303. In other countries or areas, there is listed Nickel self-fluxing alloy material of composition stipulated in International standards ISO 14920. By the way, as the self-fluxing alloy material, though high price, Co (cobalt) based self-fluxing alloy material or WC (tungsten carbide) mixed self-fluxing alloy material may be used as the need arises. Thickness of the self-fluxing alloy coating 16 is about 1.0 to 2.0 mm.

Figure 2:
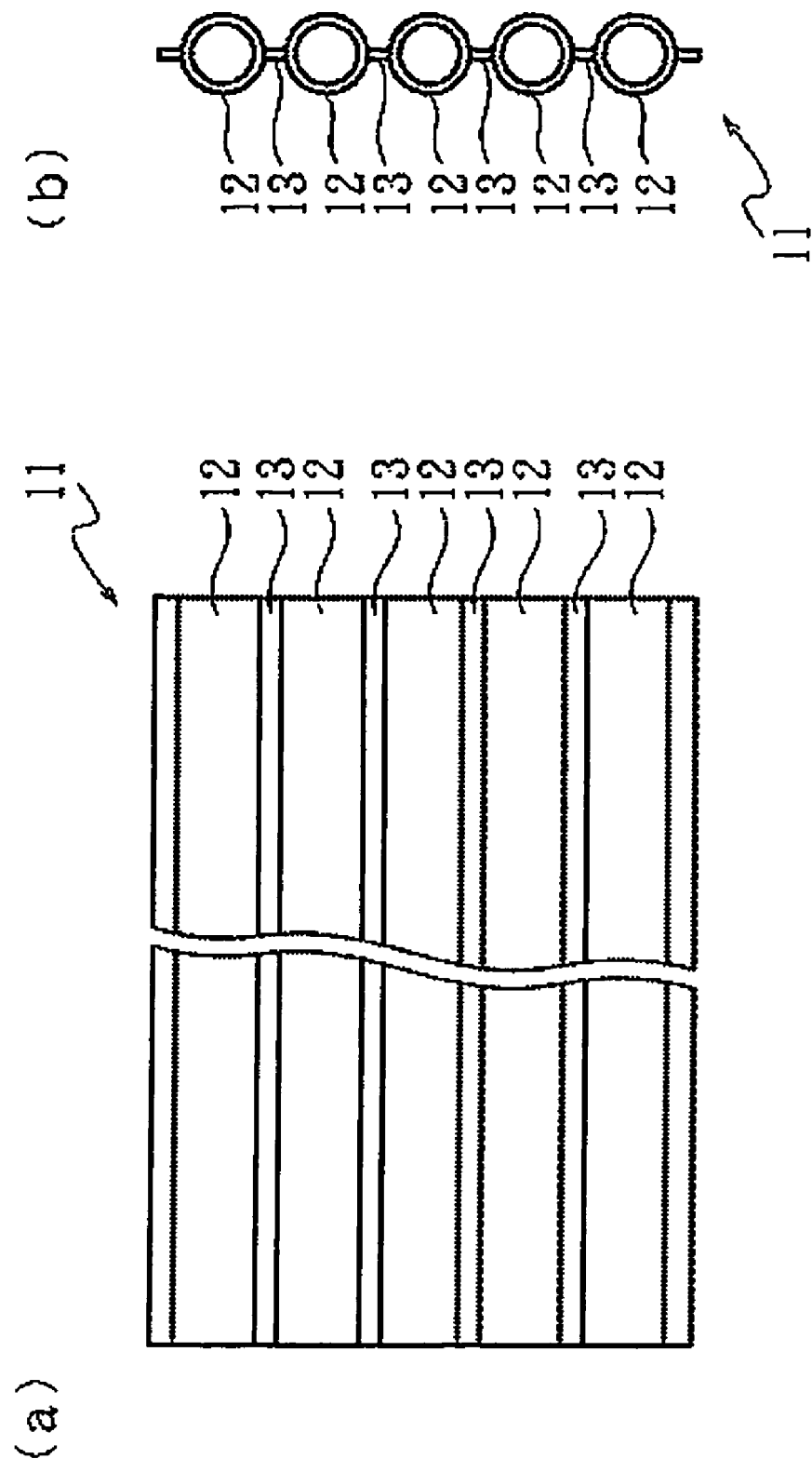
FIG. 2(a) is the entire plan view showing a manufacturing process of the alloy coated boiler part.
FIG. 2(b) is the entire front view/end elevational view showing a manufacturing process of the alloy coated boiler part.
Figure 3:
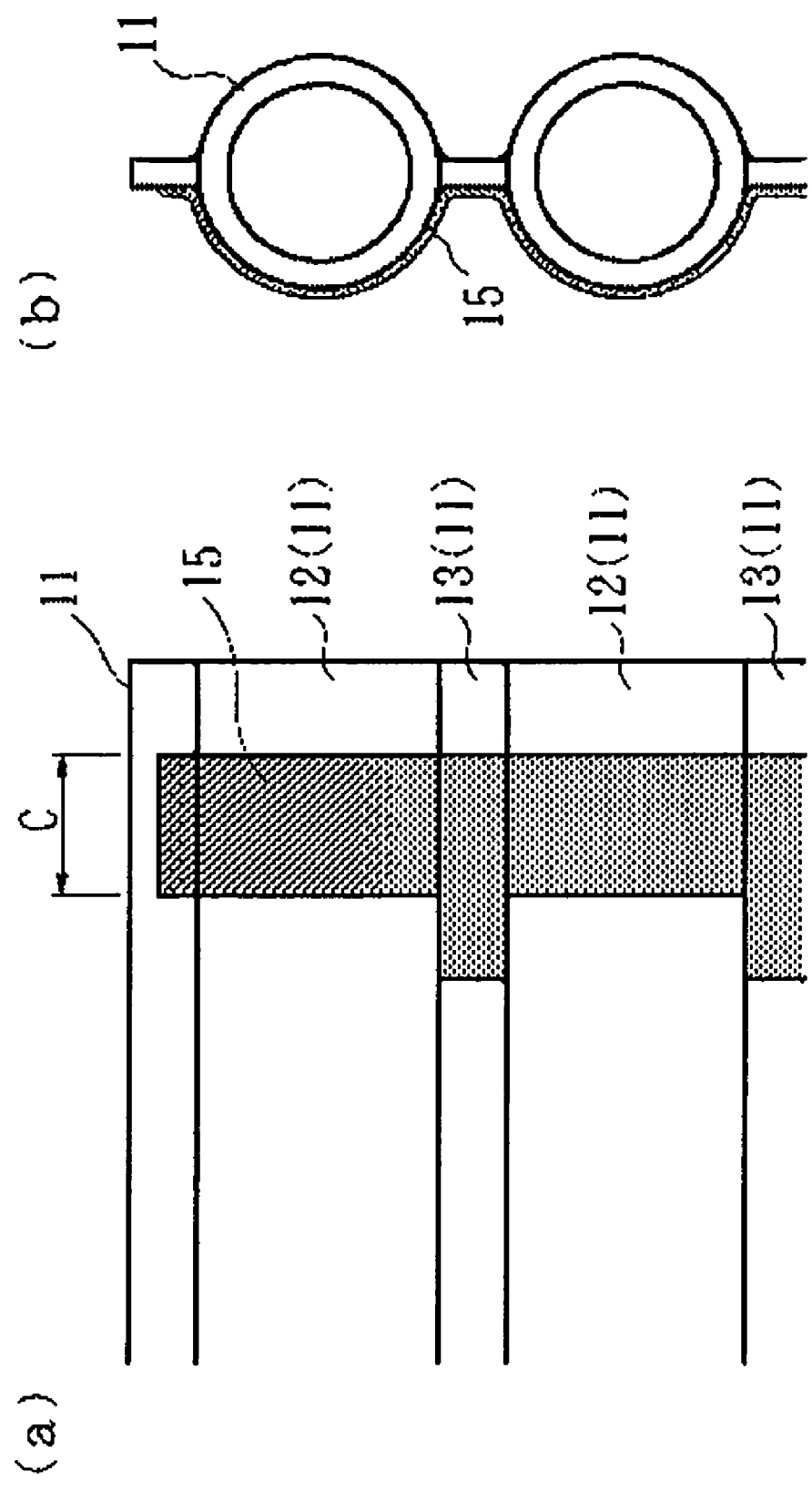
FIG. 3(a) is an enlarged plan view of the major portion showing a manufacturing process of the alloy coated boiler part.
FIG. 3(b) is an enlarged front view/end elevational view of the major portion showing a manufacturing process of the alloy coated boiler part.
Figure 4:
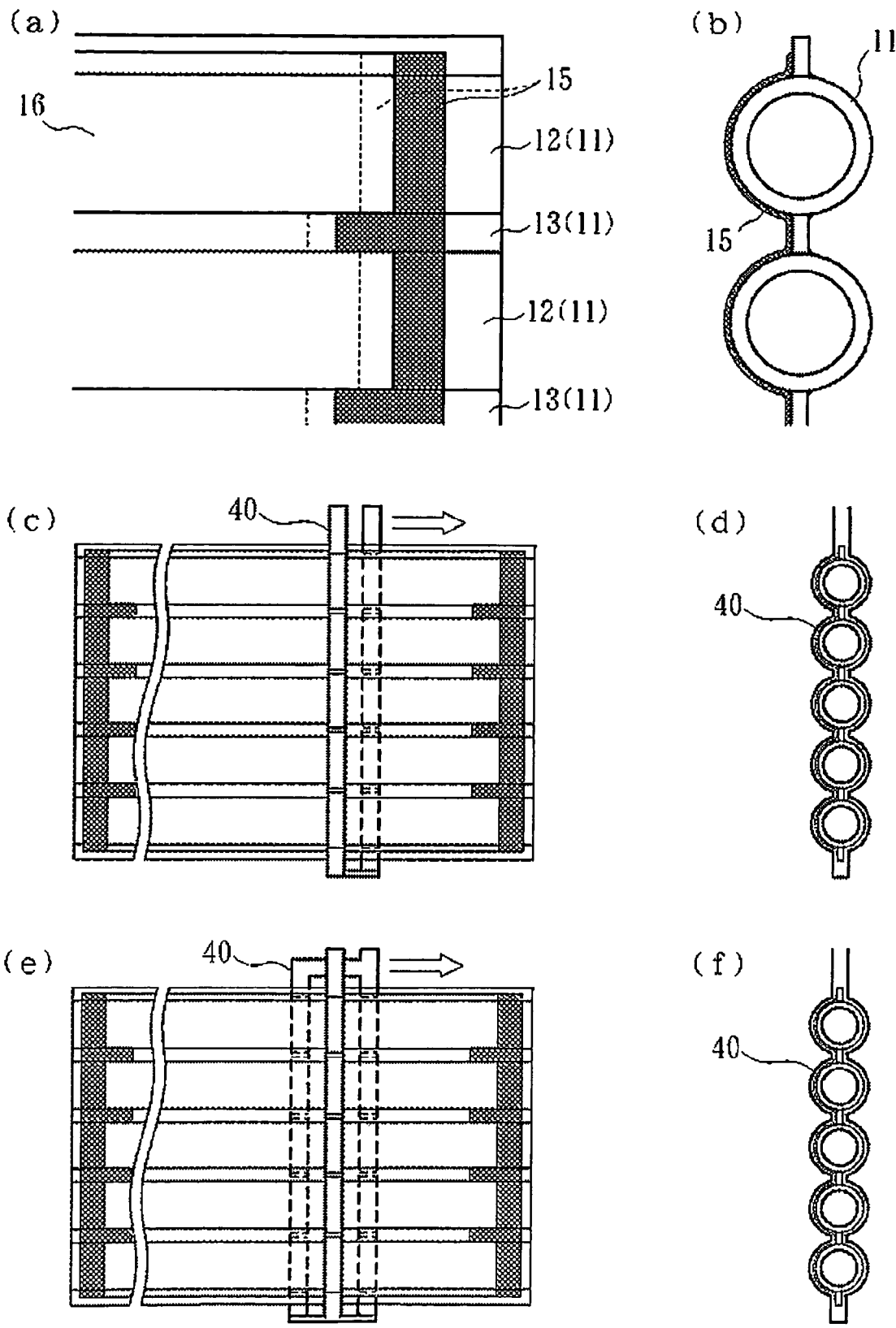
FIG. 4(a) is an enlarged plan view of the major portion showing a manufacturing process of the alloy coated boiler part.
FIG. 4(b) is a major portion enlarged front view/end elevational view showing a manufacturing process of the alloy coated boiler part.
FIG. 4(c) is the entire plan view showing a manufacturing process of the alloy coated boiler part.
FIG. 4(d) is the entire front view/end elevational view showing a manufacturing process of the alloy coated boiler part.
FIG. 4(e) is the entire plan view showing a manufacturing process of the alloy coated boiler part.
FIG. 4(f) is the entire front view/end elevational view showing a manufacturing process of the alloy coated boiler part.

A manufacturing process concerning the boiler furnace panel 10 (alloy coated boiler part) of the embodiment will be described referring to the drawings. FIG. 2(a) is the entire plan view; FIG. 2(b) is the entire front view/end elevational view; FIG. 3(a) is an enlarged plan view of the major portion; FIG. 3(b) is an enlarged plan view of the major portion; FIG. 4(a) is an enlarged plan view of the major portion; FIG. 4(b) is a major portion enlarged front view/end elevational view; FIG. 4(c) is the entire plan view; FIG. 4(d) is the entire front view/end elevational view; FIG. 4(f) is the entire front view/end elevational view; FIG. 5(a) is an enlarged plan view of the major portion; and FIG. 5(b) is a major portion enlarged front view/end elevational view.

The manufacture of the boiler furnace panel 10, in short, is one in which a steel panel 11 is taken to as a base metal, a super alloy coating 15 is formed on an one side of the steel panel 11, after that, also a self-fluxing alloy coating 16 is formed thereon, and further, end portion shape is finished, being performed in a factory.

The steel panel 11 (see FIG. 2) is preferable in the same as conventional one in which the tube portion 12 and the plate portion 13 composed of steel materials are joined alternately by the weld joint or the like. In the case of ordinary boiler furnace panel, size of the steel panel 11 is in the dimension that length is about 4000 to 6000 mm and width is about 400 to 500 mm, diameter of the tube portion 12 is about 60 to 75 mm, thickness of the tube portion 12 is about 5.0 to 7.0 mm, and thickness of the plate portion 13 is about 5 to 7 mm.

Formation of the supper alloy coating 15 concerning the end portion of the steel panel 11 (see FIG. 3), in the tube portion 12, is performed to somewhat wider range than the rapid temperature rise region width C, while, in the plate portion 13, being performed to a portion come further inwardly. By the way, in some cases, the tip of about 50 to 150 mm remains without performing coating process for fixing and keeping of the work during operation, however, at that case, it is cut off at the time of end portion shape finishing. Implementation work of the super alloy coating 15 is performed with the weld building-up, the second alloy material being made into a wire material is suited as a filler metal, above all, in Japan, the super alloy materials stipulated in JIS G 4901-NCF 625, and JIS G 4902-NCF 625 are suitable, while in other countries or areas, it is possible to select corresponding article from the super alloy materials stipulated in international standards of ISO 4955 or ISO 9723 or the like.

Formation of the self-fluxing alloy coating 16 to the remaining region of the rapid temperature rise region (see FIG. 4) is performed in the order of masking of the super alloy coating 15, thermal spraying of the self-fluxing alloy, and melting process of the self-fluxing alloy. By the way, although detailed description is omitted, surface cleaning process such as shot blast and the like is performed appropriately. Masking of the super alloy coating 15 is performed using, for example, a blocking plate such as metal thin plate or the like, or heat-resistant masking tape. Further, the masking is performed such that the super alloy coating 15 is partially overlapped on the self-fluxing alloy coating 16 in order that a base metal is not exposed from a gap formed between the super alloy coating 15 and the self-fluxing alloy coating 16. In such overlapped portion, it is preferable to add taper in thickness of the both coating so that a sudden difference in level does not emerge.

Since the thermal spraying and the after melting process for the formation of the self-fluxing alloy coating 16 is preferably performed in such a way as coating formation process to a conventional article with no super alloy coating 15 (for example, see the patent document 2), although detailed description is omitted, it is performed with ordinary procedure by using known apparatus. That is, thermal spraying of the self-fluxing alloy is performed efficiently with ordinary thermal spraying method by using known thermal spraying apparatus. As for the thermal spraying material of the self-fluxing alloy coating 16, the first alloy material powdered is suited, above all, in Japan, nickel self-fluxing alloy material corresponding to JIS H 8303-SFNi 4 is preferable, in other countries or areas, it is possible to select corresponding article from nickel self-fluxing alloy materials stipulated in the international standards of ISO 14920.

Further, basically, the melting process of the self-fluxing alloy is performed efficiently in one direction with ordinary movement heating method by using known high frequency induction heating apparatus.

However, different from the conventional method, sufficient thermal spraying process is made to bring under the condition of one directional movement to the self-fluxing alloy coating 16 thermally sprayed to the plate portion 13 (see patent documents 2, 3).

In the case of coating with the above alloy materials, it is preferable to set thickness ratio between the super alloy coating 15 and the self-fluxing alloy coating 16 into 1.2 to 2.0:1. This is because wear-resistance of the self-fluxing alloy coating is superior to the super alloy coating, thus, by presetting the coating thickness ratio of the above range depending on conditions, wear-resistant service life of the both coatings are equalized. That is, in less than 1.2:1, wear of the super alloy coating 15 precedes, there is a fear that remaining self-fluxing alloy coating 16 becomes useless, on the other hand, exceeding 2.0:1, inversely wear of the self-fluxing alloy coating 16 precedes, there is a fear that remaining super alloy coating 15 becomes useless.

Figure 5:
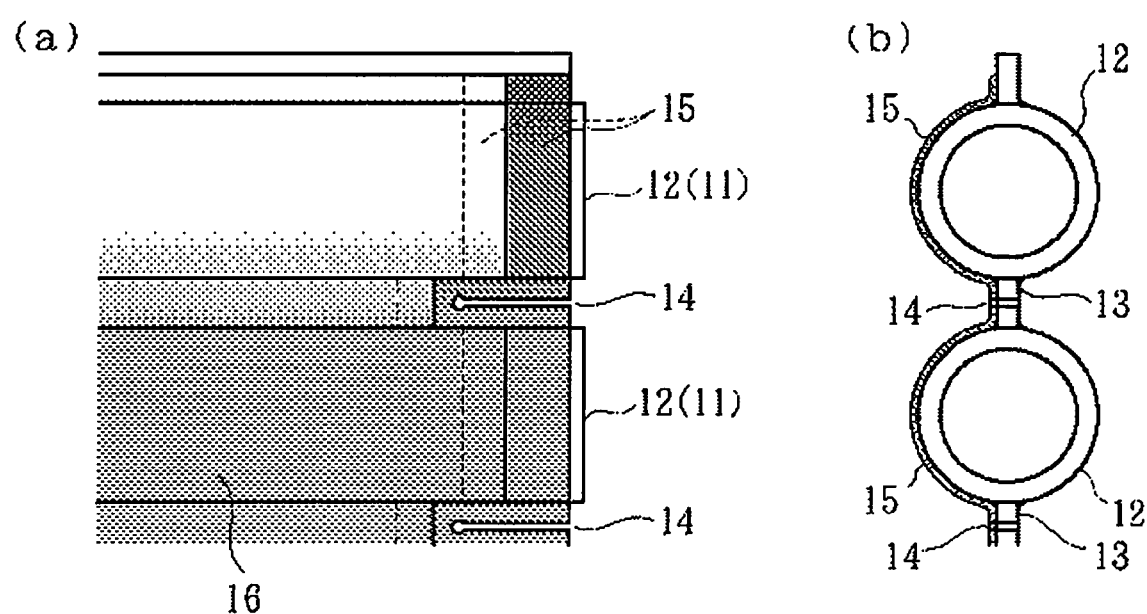
FIG. 5(a) is an enlarged plan view of the major portion showing a manufacturing process of the alloy coated boiler part.
FIG. 5(b) is a major portion enlarged front view/end elevational view showing a manufacturing process of the alloy coated boiler part.

After formation of the alloy coatings 15, 16 on one side of surface, un-coated portion of the tip of the steel panel 11 is cut off (see FIG. 5). This is done by a plasma cutting or the like, simultaneously or another time, a notch 14 is formed. Further, chamfering process is carried out at the tip of the tube portion 12 while preparing for weld joint for another boiler furnace panel 10 (see FIGS. 1(*c*), 1(*e*)).

Thus, when terminating the finishing of the end portion, one of the boiler furnace panel 10 is completed. Further, similarly, when the boiler furnace panel 10 is efficiently manufactured one after another, these are accumulated to be kept in a factory or warehouse or the like.

Figure 6:
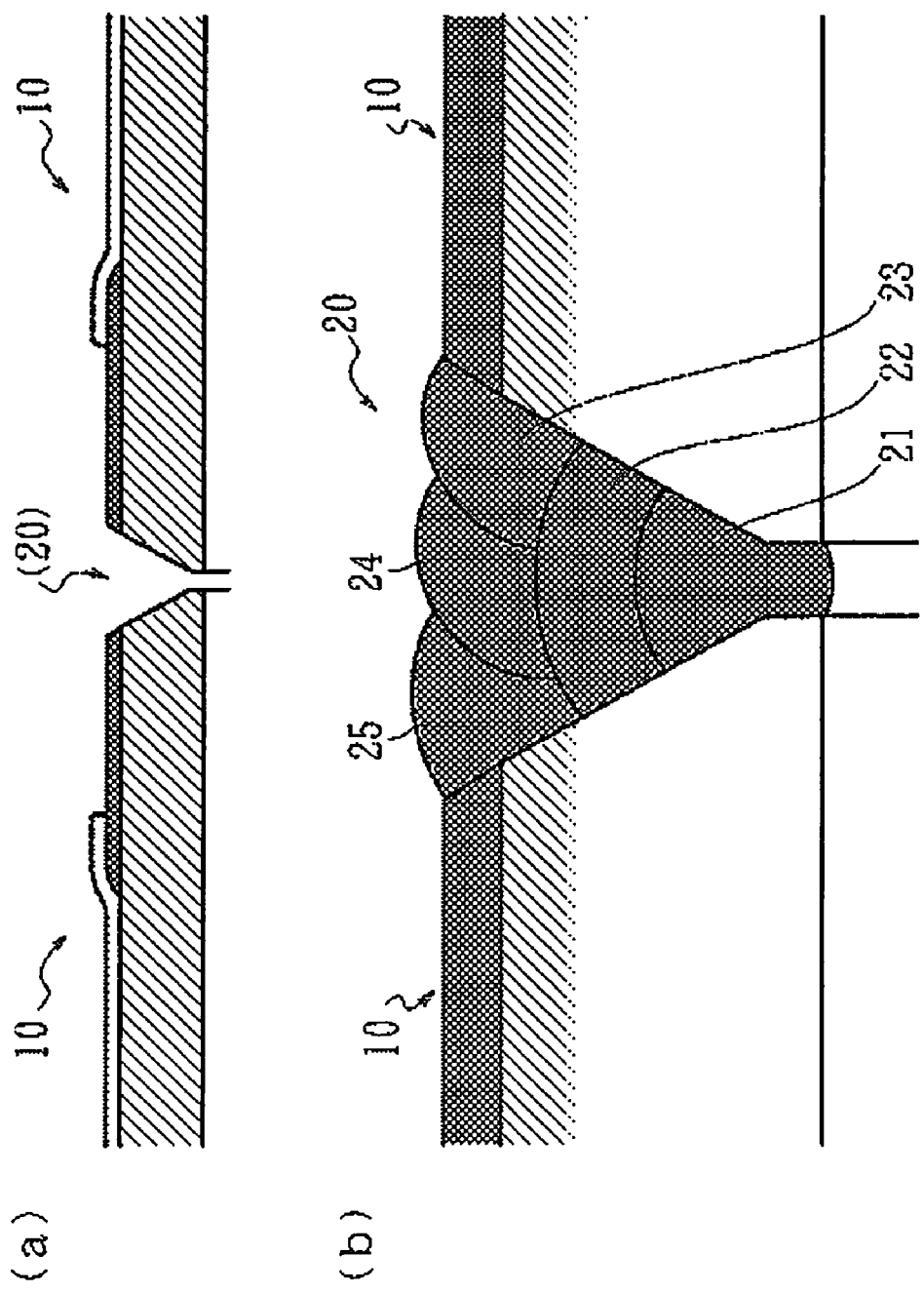
FIG. 6(a) is a cross sectional view showing the weld joint portion before the welding of welding process of the alloy coated boiler part.
FIG. 6(b) is an enlarged cross sectional view showing the weld joint portion after welding of welding process of the alloy coated boiler part.

Use state concerning the boiler furnace panel 10 (alloy coated boiler part) of the embodiment will be described referring to the drawings. Since a plurality of boiler furnace panels 10 are assembled into a boiler furnace with the plurality of panels with weld-joining, here, particularly there will be described weld process of the boiler furnace panels 10 each other. FIG. 6(*a*) is a cross sectional view showing the weld joint portion before the implementation of welding process of the alloy coated boiler part; and FIG. 6(*b*) is an enlarged cross sectional view showing the weld joint portion after welding of welding process of the alloy coated boiler part. Further, FIG. 1(*f*) is a plan view showing a joined state of a plurality of the boiler furnace panels 10.

Weld joint process comprises positioning (aligning) process, tube end portion weld joint process and plate portion weld joint process, under that order, treatment of each process is applied to weld joint portion 20 of a pair of weld object boiler furnace panels 10. In some cases, this is partially performed in assembling factory, however, this is performed finally in a boiler construction site.

Firstly, in the positioning process (see FIG. 6(*a*)), both boiler furnace panels 10 are fixed in the state that the tip end portions of tube part 12 to become the weld joint portion 20 are caused to face. Then, if there is position deviation in each tube end portions faced state, and the position deviation is slight one which is generated by formation of the alloy coatings 15, 16, position adjustment of the faced tube end portions is performed by knocking a small wend portion into the notch 14 and the like.

Next, in the tube end portion weld joint process (see FIG. 6(*b*)), annular welding is performed from a tube inner surface side to a tube outer surface side for several times for no generation of voids, and for no overheating. In the shown example, since being separated in five layers, the welding starts from the annular welding of a super alloy welding layer 21 facing on hollowness of the tube, followed by the annular welding of a super alloy welding layer 22 buried with the tube thickness, further, three columns of super alloy welding layers 23, 24 and 25 exposed on the tube outer periphery are carried out sequentially every one round. As for the filler metal used in the tube end portion welding process, the second alloy material as being the super alloy coating 15 is desirable in the point of balance of corrosion resistance, and wear resistance to the self-fluxing coating. The super alloy coating 15 carried out using the second alloy material has no thermal shock cracking sensitivity, therefore, the welding is performed easily and accurately without injuring the coating. Further, as for the self-fluxing alloy coating 16 ahead of it, though having the thermal shock cracking sensitivity, since the super alloy coating 15 covers the rapid temperature rise region width C, also, it is not necessary for concerning a generation of cracking.

Finally, in the plate portion weld joint process, although illustration is omitted, an application plate with a size for covering at least both notches 14 is welded while extending over the plate portion 13 of the both boiler furnace panels 10. The welding of the application plate is performed from the other side (that is, un-formed surface of the super alloy coating 15, furnace outer wall surface or unprotected surface). The notch 14 is thin and further change of the application plate is easy, therefore, in some cases, process is terminated by leaving inner side of the notch 14 in the state of the base metal as it is, that is, the inner side of the notch 14 is left such that the steel panel 11 is exposed, however, it may be preferable to fill up in the notch 14 with the welding while using the second alloy material as being the super alloy coating 15 as the filler metal. Further, as for the plate portion 13, different from the tube portion 12, since the repair after the boiler construction is easy to perform (even the repair being performed from outside the boiler, rough object can be achieved), it may be adopted the procedure that, after realizing long service life while thickening a panel end portion plate or plate thickness of the application plate, the alloy coating is omitted.

Thus, the boiler furnace panel 10 is joined to one after another (see FIG. 1(*f*)), the furnace housing with cooling water passage is completed.

In such a furnace housing, the entire region concerning the entire surface of inner wall, or portion to be protected of the inner wall surfaces, are covered with close alloy coating, thereby, erosion/corrosion resistance is improved significantly.

Next, processes concerning one embodiment of the method of welding the self-fluxing alloy coated boiler part of the present invention will be described referring to the drawings. FIG. 7(*a*) is a plan view of a boiler tube; FIG. 7(*b*) is a plan view/end elevational view of a boiler tube; FIGS. 7(*c*) to 7(*h*) are plan views of a boiler tube; and FIGS. 8(*a*) and 8(*b*) are plan views of a boiler tube.

Here, there will be described supplying method of the boiler tube at the construction site which the boiler tube is not prepared beforehand. Provided that the steel boiler tube 70 subjected to the self-fluxing alloy coating on outer circumferential surface being a portion to be protected (see FIGS. 7(*a*), 7(*b*)) can be obtained rapidly, however, its length does not agree with the assembling portion (see FIG. 7(*c*)). Further, the self-fluxing alloy coating is alloy material occupied by Ni-enriched Ni—Cr component over a half proportion of the alloy material, and in which B and Si are mixed in the range of 1 to 5% respectively, that is, the self-fluxing alloy coating is the first alloy material (above described material of the self-fluxing alloy coating 16) having the thermal shock cracking sensitivity, when it is welded in the state that self-fluxing alloy coating 16 is left as it is, the welding becomes not desired state.

Accordingly, an adaptation portion with required length is made to remain by cutting off a surplus portion 71 from the boiler tube 70 (see FIG. 7(*d*)), for after weld joint (see FIG. 8(*b*)), firstly, performed is the welding of the weld building-up at both end portions of the adaptation portion 72 being the adoption portion (see FIGS. 7(*e*) to 7(*h*), and FIG. 8(*a*)). The process order of the welding is described in detail, firstly, the self-fluxing alloy coating is removed from the both end portions 73, 74 within the adaptation portion 72 (see FIG. 7(*e*)). The base metal exposed width of the end portions 73, 74 are the same as the above described rapid temperature rise region width C, though cannot be described indiscriminately, being about 15 to 50 mm.

After that, an induction coil 75 configured such that the coil 75 is wound in a solenoid shape and its winding pitch increases monotonously (see FIG. 7(*f*)) is made to connect to the high frequency induction heating apparatus; the end portion 73 is inserted to be fitted with freedom into the coil 75 (see FIG. 7(*g*)), to perform preheating process due to induction heating. At this time, an induction coil 75 which has a length of 2 to 3 times of base metal exposed width in the end portion 73 is used, where rough portion of the winding pitch is set to an intermediate portion side of the adaptation portion 72 while dense portion of the winding pitch is set to the end portion 73 side between both end portions of the induction coil 75. Further, energizing condition of the induction coil 75 set on the high frequency induction heating apparatus is made a gradual speed heating condition that a temperature raising speed in the end portion 73 becomes 2 to 10° C.

Then, the adaptation portion 72 is preheated slowly with heating pattern where the amount of temperature rise gradually decreases inwardly from the end portion 73. Subsequently, if the temperature of the maximum temperature portion becomes 450 to 600° C., the heating ends. By this means, "gradation preheated region" with no sudden change in a respect of space in axial direction and in respect of elapse of time is formed, therefore, consecutively, that is, swiftly before being cooled, the super alloy coating 76 is formed at the end portion 73 of the adaptation portion 72 (see FIG. 7(*h*)). The formation is performed such that, with the weld building-up, no base metal exposed surface is made to leave at the position between the self-fluxing alloy coating and the super alloy coating 76.

Further, in the weld building-up, the second alloy material (above described the material of the super alloy coating 15) with no thermal shock cracking sensitivity is used as the filler metal. That is, the alloy material occupied by an Ni-enriched Ni—Cr component over a half proportion of the alloy material and contents of B and Si being melting point lowering elements are suppressed such that B is 0.1% or less and Si is 0.5% or less is taken to as the filler metal, and the welding is performed.

In such a welding, previous formation is the self-fluxing alloy coating, and after formation is the super alloy coating, however, the welding is carried out within the "gradation preheating region", therefore, there is no chance of cracking the self-fluxing alloy coating.

Thus, the adaptation portion 72 of the boiler tube 70 is constituted such that, as for the end portion 73 being an object region of the later weld joint, the super alloy coating by the second alloy material is formed extending over the rapid temperature rise region, and, at the inner remaining region from the super alloy coated region, the self-fluxing alloy coating is left. Then, if the same welding is performed with respect to the remaining end portion 74, the corresponding boiler tube 80 to the boiler furnace panel 10 described above is completed (see FIG. 8(*a*)). Also the other tubes 81, 82 joined to the boiler tube 80 are prepared similarly at the construction site if necessary, and then being kept temporarily.

Then, at the time of the weld joint, the boiler tubes 80, 81 and 82 as being joining object are arranged at the construction site, after performing the required pipe end portion treatment such as formation of the welding grooves, the boiler tubes 80, 81 and 82 are made to fix with the condition that the tips of the boiler tubes 80, 81 and 82 are oppositely faced to each other at the weld joint portions 83, 84 (see FIG. 8(*b*)). Then, the weld joint of the pipe end portions is performed to the respective weld joint portions 83, 84 while using the same filler metal used for the weld building-up of the super alloy coating 76. The tube end portion weld joint of the boiler tube 80, like the tube end portion weld joint of the tube portion 12 described above, can be performed easily without a concern of the thermal shock cracking of the self-fluxing alloy coating, and the preheating is not necessary.

Processes concerning the other embodiment of the method for welding the self-fluxing alloy coated boiler part of the present invention will be described referring to the drawings. FIGS. 9(*a*) and 9(*b*) are plan views of major portions of a boiler tube.

Here, there will be described the weld joint method when it becomes necessary to perform the weld joint of the steel boiler tubes 90 subjected to the self-fluxing alloy coating on the outer circumferential surface at the construction site in a hurry. Here, also, since the self-fluxing alloy coating is alloy material occupied by Ni-enriched Ni—Cr component over a half proportion of the alloy material, and in which B and Si are mixed in the range of 1 to 5% respectively, that is, the self-fluxing alloy coating is the first alloy material (above described material of the self-fluxing alloy coating 16) having the thermal shock cracking sensitivity, when it is welded in the state that self-fluxing alloy coating 16 is left as it is, the welding becomes not desired state, there is performed formation of the "gradation preheated region" by using the high frequency induction heating apparatus.

Reasonably, the preheating of this case, different from the above described respective embodiments, is performed immediately before the weld joint. Further, in many cases, the both boiler tubes 90 of the joining object are already fixed at the construction site, and it is difficult to separate the both end portions 91. For that reason, it is preferable that the end portion 91 is subjected to pre-processing of forming the weld grooves, while, for the induction coil 92, one-turn article capable of acting in deployment, and put on and taken off is adopted (see FIG. 9(*a*)). Then, when performing the heating for formation of the "gradation preheated region" while high frequency energizing the induction coil 92, the induction coil 92 is caused to reciprocate.

The reciprocating movement is performed many times until the temperature of the maximum temperature portion arrives at 450 to 600° C. Further, the heating is performed at the region of the end portion 91 in gradual speed, to the contrary, with being separated from the end portion 91 in rapid speed, in order that the heating pattern becomes a pattern where the amount of temperature rise gradually decreases with heading toward the both directions, with the end portion 91 of the weld joint object as the center, that is, the heating pattern becomes a pattern where the amount of temperature rise gradually decreases with heading inwardly in longitudinal direction of the boiler tube 90 from the end portion 91. The reciprocating distance, at one side, that is, with respect to one boiler tube 90, of about 15 to 50 mm is secured inwardly from the end portion 91. Further, in this case also, energizing condition of the induction coil 92 set to the high frequency induction heating apparatus is set to gradual speed heating condition such that the temperature raising speed in the end portion 91 becomes 2 to 10° C./sec.

Then, also in this case, "gradation preheated region" with no sudden change in respect of space in axial direction and in respect of elapse of time is formed, therefore, consecutively, faced end portions 91 of the boiler tube 90 are made to perform weld joint swiftly (see FIG. 9(*b*)). The weld joint of the weld joint portion 93, like the tube end portion weld joint of the tube portion 12 described above, is performed in which the second alloy material (above described material of the super alloy coating 15) with no thermal shock cracking sensitivity is taken to as the filler metal. That is, in this case also, the filler metal is the alloy material occupied by an Ni-enriched Ni—Cr component over a half proportion thereof and contents of B and Si are suppressed such that B is 0.1% or less and Si is 0.5% or less, however, since the gradation preheating precedes immediately before, there is no case where the self-fluxing alloy coating is cracked.

The others, in the above described respective embodiments, as the specific example, production in the factory of the boiler furnace panel 10 and obtaining in construction site of the boiler tube 80 are described, however, there may be the reverse. That is, like the above description, also production of the boiler tube 80 in the factory, and obtaining the boiler furnace panel 10 in the construction site are appropriately performed, though the detailed description as being repetition is omitted.

The invention claimed is:

1. An alloy coated boiler part for welding, comprising, before welding:
    a base material body, and
    a coating which coats the base material body, the coating composed of an alloy material comprising Ni and Cr in total over a half proportion of the alloy material, the coating including
        a weld-area coating composed of said alloy material in which B is 0.1 weight % or less and Si is 0.5 weight % or less said weld-area coating being positioned at an end portion subjected to welding and the vicinity thereof, and
        a non-weld-area coating composed of said alloy material in which the contents of B and Si are in the range of 1 to 5 weight % respectively.

2. The alloy coated boiler part according to claim 1, wherein said weld-area coating covers a region from the end portion subjected to the welding and positions apart from the end portions by 15 to 50 mm.

3. The alloy coated boiler part according to claim 1 or claim 2, wherein said alloy materials for the weld-area coating is composed of super alloy materials corresponding to JIS G 4901, 4902-NCF 625, and said alloy materials for the non-weld-area coating is composed of nickel self-fluxing alloy materials corresponding to JIS H 8303-SFNi 4, and thickness ratio between said the weld-area coating and said the non-weld-area coating is set to 1.2 to 2.0:1.

4. The alloy coated boiler part according to claim 1 or claim 2, wherein said alloy coated boiler part is a boiler furnace panel or a boiler tube.

5. The alloy coated boiler part according to claim 1 or claim 2, wherein said alloy coated boiler part is a boiler furnace panel in which a tube material and a plate material are joined alternately, and a notch is formed, at the end portion of said plate material.

* * * * *